United States Patent
Murata et al.

(10) Patent No.: US 6,841,237 B2
(45) Date of Patent: Jan. 11, 2005

(54) OPTICAL SHEET AND PROCESS FOR PRODUCTION OF THE SAME

(75) Inventors: Makoto Murata, Shizuoka (JP); Kensaku Higashi, Shizuoka (JP)

(73) Assignee: Tomoegawa Paper Co., Ltd., Tokyo (JP)

( * ) Notice: Subject to any disclaimer, the term of this patent is extended or adjusted under 35 U.S.C. 154(b) by 9 days.

(21) Appl. No.: 10/115,248

(22) Filed: Apr. 4, 2002

(65) Prior Publication Data

US 2002/0172810 A1 Nov. 21, 2002

(30) Foreign Application Priority Data

Apr. 10, 2001 (JP) ........................................ 2001-111698

(51) Int. Cl.[7] ............................. B32B 5/16; B05D 5/06
(52) U.S. Cl. ...................... 428/323; 428/325; 428/327; 428/343; 428/352; 427/164
(58) Field of Search ............................... 428/323, 325, 428/327, 343, 352, 40.1; 427/164

(56) References Cited

U.S. PATENT DOCUMENTS

| 5,169,707 A | * | 12/1992 | Faykish et al. | ............. 428/195 |
| 5,988,822 A | * | 11/1999 | Abe et al. | .................... 359/541 |
| 6,383,558 B1 | * | 5/2002 | Fujiwara et al. | ............ 427/164 |
| 6,558,009 B2 | * | 5/2003 | Hannington et al. | ........ 359/534 |
| 6,692,647 B2 | * | 2/2004 | Moshrefzadeh et al. | ...... 216/24 |

FOREIGN PATENT DOCUMENTS

JP 2001-026061 * 1/2001

* cited by examiner

*Primary Examiner*—D. S. Nakarani
*Assistant Examiner*—Nikolas J Uhlir
(74) *Attorney, Agent, or Firm*—McDermott Will & Emery LLP

(57) ABSTRACT

The invention provides an optical sheet having and sufficiently exhibiting high light transparency and uniform light diffusivity. The optical sheet comprises transparent resin layers 2 and 3 and a fine particle layer 5 consisting of transparent fine particles 4 which are arranged as a monoparticle layer between the transparent resin layers 2 and 3 in an embedded state, wherein the refractive indexes of said transparent resin layers are different from that of said transparent fine particle. The optical sheet is produced by a process which comprises at least a step of forming a transparent resin layer having at least temporary stickiness on a substrate, a step of forming a fine particle layer by covering said transparent resin layer with transparent fine particles so as to form a monoparticle layer and fixing them, and a step of laminating a transparent resin layer on said fine particle layer.

10 Claims, 4 Drawing Sheets

OPTICAL SHEET AND PROCESS FOR PRODUCTION OF THE SAME

BACKGROUND OF THE INVENTION

1. Field of the Invention

The present invention relates to an optical sheet which is suitably used in displays such as LCD (liquid crystal display), EL (electro-luminescence) display, FED (field emission display), etc. and particularly having excellent effects on prevention of luminance irregularity, improvement in contrast of the displays, and having a wide visual field angle.

2. Description of the Related Art

Displays such as LCD, EL, FED, etc. have been remarkably developed in recent years. In particular, the LCD is spread in various fields, such as for notebook personal computers, portable terminals, etc., and the expectation to the future is big for them.

This LCD is roughly classified into a reflection type one and a transmission type one by how to take light for illuminating a liquid crystal panel thereinto. In the reflection type is a system that a reflection plate, on which an aluminum or silver film having a high reflectivity has been stuck, is arranged on the back surface of the liquid crystal panel, and the light which is struck on it from the surface side of the display is reflected by the reflection plate to illuminate the liquid crystal panel, thereby liquid crystal images being formed. On the other hand, the transmission type is a system that the liquid crystal panel is illuminated by a back light unit arranged on the back surface of the liquid crystal panel.

In the reflection type LCD, in order to prevent contrast from being deteriorated by the ground color of the aluminum or silver, it is conducted to interpose a medium that moderately diffuses the light between the liquid crystal panel and the reflection plate to bring the background color near to a paper white color.

In the transmission type LCD, in order to prevent visibility from being deteriorated by a light-scattering printing pattern formed on an acrylic light-guide plate making up the back light unit, it is so constructed that a medium that moderately diffuses light is interposed between the liquid crystal panel and the back light unit to illuminate the liquid crystal panel by uniform surface light.

As mentioned above, the light-diffusing medium (referred to as "light diffuser", hereinafter) is generally used in both systems of the reflection type and the transmission type. As such light diffusers, are known an interior light diffuser that transparent fine particles having a different refractive index from that of the transparent resin are dispersed in the transparent resin layer, so that the light diffuses in the inside of the layer, an exterior light diffuser that the surface of a resin layer is roughened to form ruggedness on the surface, thereby the light diffusing on the surface, and an interior-exterior light diffuser that a part of transparent fine particles projects on the surface of the transparent resin layer so that the light diffuses both in the interior and on the exterior.

However, the above mentioned interior diffuser has a problem that the light transmittance is generally low. In the interior light diffuser, since the fine particles are dispersed at random in the transparent resin, the light ray passes through a large number of fine particles to cause extra light scattering when the light passes through the transparent resin. As a result, the light transparency becomes low.

The exterior light diffuser and the interior-exterior light diffuser have each a problem that the irregularity in the light diffusivity is often observed, since the degree of light diffusivity depends on the irregularity of the surface. Though it is necessary to control the height and pitch of the ruggedness in the surface so as to have a fixed state in order to reduce the diffusive irregularity, it is very difficult to do so. In addition, there is a problem that the adherent fouling is hard to be removed because of surface irregularity.

The present invention has been made in the light of the above described circumstances. An object of the present invention is therefore to provide an optical sheet having and sufficiently exhibiting high light transparency and uniform light diffusivity.

SUMMARY OF THE INVENTION

The optical sheet according to the present invention comprises a light transmissive resin layer and a fine particle layer consisting of transparent fine particles which are embedded in said light transmissive resin layer as a monoparticle layer, wherein the refractive index of said light transmissive resin layer is different from that of said transparent fine particles.

According to the optical sheet of the present invention, high light transparency and uniform light diffusivity can be exhibited, because the incident light ray passes only one time through the transparent fine particles so that extra light scattering observed in the prior interior light diffuser is not caused, and because the surface has no irregularity shown in the prior exterior light diffuser.

In the optical sheet according to the present invention, the light transmissive resin layer may consist of two transparent resin layers, wherein the fine particle layer is formed on the boundary plane of these two transparent resin layers.

Further, a substrate may be laminated on the surface of at least one of the transparent resin layers.

The substrate may be a transparent substrate. Alternatively, the substrate may be releasing paper or releasing film.

At least one of said transparent resin layers may be composed of a pressure-sensitive adhesive.

Moreover, the process for production of an optical sheet according to the present invention comprises at least a step of forming a transparent resin layer having at least temporary stickiness on a substrate, a step of forming a fine particle layer by covering said transparent resin layer with transparent fine particles so as to form a monoparticle layer and fixing them, and a step of laminating a transparent resin layer on said fine particle layer.

Figure 1:
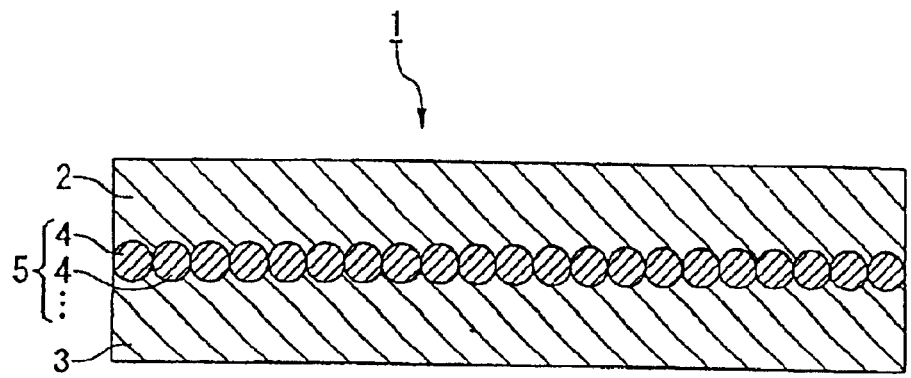
FIGS. 1 to 3 are each a cross sectional view typically illustrating an exemplary optical sheet according to the present invention.

In the drawings, meanings of reference characters are as follows:

1: optical sheet, 2: transparent resin layer, 3: transparent resin layer, 4: transparent fine particle, 5: fine particle layer, 6: substrate, 10: optical sheet, and 11: optical sheet.

DETAILED DESCRIPTION OF PREFERRED EMBODIMENTS

In the following, the present invention will be illustrated in detail.

FIG. 1 is a schematic cross sectional view of an example of the optical sheet according to the present invention. The optical sheet 1 is composed of transparent resin layers 2 and 3 which compose the light transmissive resin layer and a fine particle layer 5 consisting of transparent fine particles 4, said transparent fine particles 4 being arranged parallel to the surface of the transparent resin layer in a high density without overlapping in the thickness direction to form a monoparticle layer in an embedded state between the two transparent resin layers.

In the present specification, the term "monoparticle layer" means that the transparent fine particles 4 are arranged as uniformly as possible between the two transparent resin layers without overlapping in the thickness direction.

The transparent fine particles 4 which should be transparent are preferred to be spherical and to have the refractive index in a range of 1.42–1.60, because of affording high transparency. Specific examples of such transparent find particles to be used include inorganic fillers such as silica, glass powder, quartz, etc. and fine particles of organic materials such acrylic resin, polystyrene resin, styrene-acrylic copolymer, polyvinylidene fluoride, polytetrafluoroethylene (trademark: TEFLON) divinylbenzene resin, phenol resin, urethane resin, cellulose acetate, nylon, cellulose, benzoguanamine resin, melamine resin, etc.

The transparent fine particles 4 are preferred to have a particle diameter of 1–50 $\mu$m, and more preferably 1–10 $\mu$m in case of using, particularly, for the liquid crystal displays, etc. There is always no necessity that the transparent fine particles are colorless, if the light transparency is high. The colored transparent fine particles can therefore be used in the present invention.

Regarding the resin composing the transparent resin layer 2 and 3, the resin which is optically transparent, temporarily has the stickiness at least, and has a refractive index different from that of the transparent fine particles 4 can used in the present invention. When the refractive indexes of the transparent resin layers are not different from that of the transparent fine particle, sufficient light diffusivity cannot be obtained.

Although any opaque resin can be used so far as it transmits light, it is preferable to have light transparency as high as possible. Resins having a light ray transmittance (JIS C6714) of 80% or more and, particularly, 85% or more are suitably used in the present invention. If the light transparency of the resin is high, the resin having color itself or the resin colored with dyes or pigments can be used in the present invention.

The property that the resin temporarily has the stickiness at least is required for production of the optical sheet in order to attach the transparent fine particles to the transparent resin layer and to fix them.

As the material having such a property, there is the so-called pressure-sensitive adhesive which always has stickiness. In addition, the resin which exhibits stickiness with heat, the resin which exhibits stickiness by impregnating with a solvent, and the resin which is curable with light or heat can be used in the present invention.

Examples of such resins include polyester, polyamide, polyvinyl alcohol, polyurethane, polystyrene, polyacetal, polycarbonate, acrylic resin, epoxy resin, silicone resin, cellulose, etc. and derivatives of them. These resins may be used alone or as a mixture of two or more of them. When the optical sheet is produced using two kinds of resins and laminating two resin layers via the fine particle layer consisting of transparent fine particles, at least one of the resins should have a refractive index different from that of the transparent fine particles.

The refractive indexes of the transparent resin layers 2 and 3 may be identical or different each other. It is anyway preferable that the refractive indexes of the transparent resin layers 2 and 3 are in a range of 1.40–1.70 in order to obtain high light transparency.

The thickness of the transparent resin layers 2 and 3 is not restricted, if the irregularity caused by the transparent fine particles 4 in the fine particle layer 5 does not appear on the surfaces of the transparent resin layers 2 and 3. The transparent resin layer may have the different thickness in both sides of the fine particle layer 5.

In the optical sheet 1, the incident light ray introduced from the surface of the transparent resin layer 2 or 3 diffuse upon passing through the transparent fine particles 4, because the transparent fine particles 4 are embedded as a monoparticle layer. As a result, high light transparency can be obtained without causing extra light scattering because the light ray passes only one time through the fine particle. The light diffusivity can be controlled by varying the refractive index of the transparent resin layers 2 and 3 or the particle size of the transparent fine particles 4.

Figure 2:
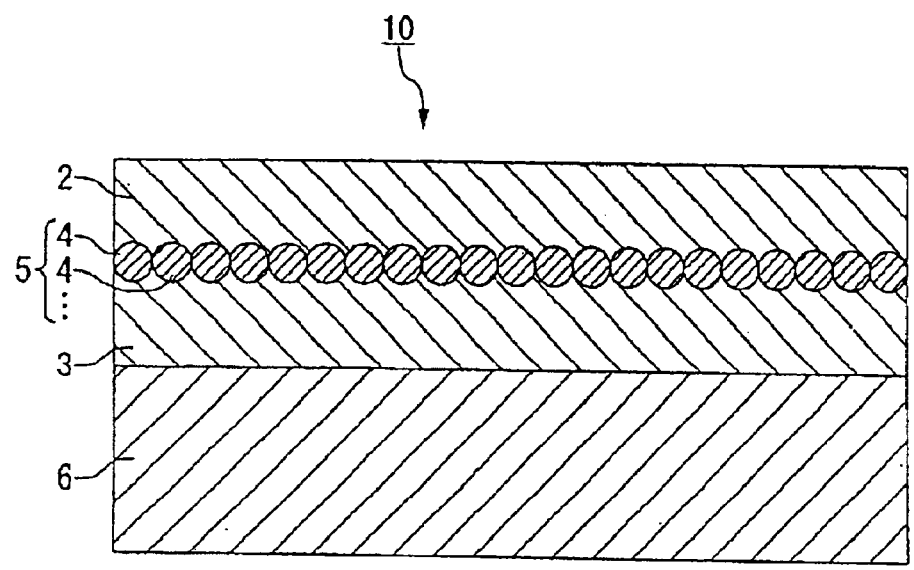
Figure 3:
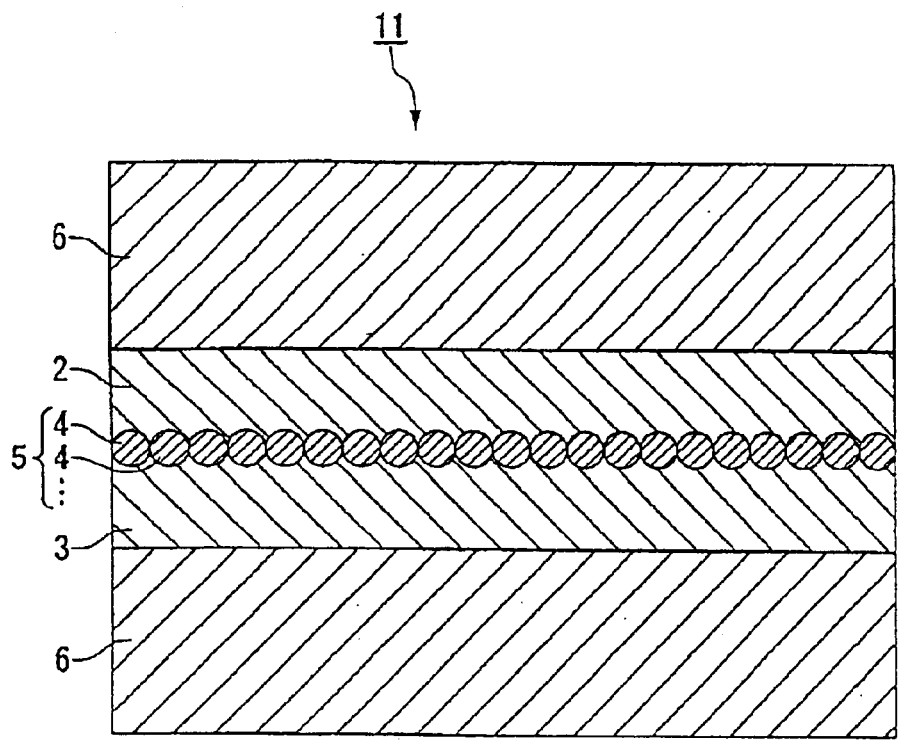

Incidentally, the optical sheet according to the present invention is not restricted to the optical sheet 1 as shown in FIG. 1. An optical sheet 10 as shown in FIG. 2 wherein a substrate 6 is laminated on the surface of the transparent resin layer 3, and an optical sheet 11 as shown in FIG. 3 wherein the substrates 6 and 6 are laminated on the surface of the transparent resin layer 2 and that of the transparent resin layer 3, are also included in the scope of the present invention. In the optical sheet according to the present invention, it is possible that at least one of the transparent resin layers is composed of a pressure-sensitive adhesive, and a releasing film or releasing paper sheet is used as the substrate so as to contact with the pressure-sensitive adhesive. In such a case, the optical sheet can be used itself as the adhesive member after peeling off the substrate. Since the optical sheet in such a case has stickiness itself, the work efficiency is improved upon assembling LCD, etc., because it is not necessary to provide with an adhesive layer for attaching liquid crystal cells or backlight units. In addition, handling in the step of assembling the LCD, etc. is good, because the surface of the optical sheet is covered with the releasing film or the releasing paper.

As the substrate 6, transparent films can be suitably used. Although any opaque substrate may be used as the substrate 6 so far as it transmits light, it is preferable to have light transparency as high as possible. Substrates having a light ray transmittance (JIS C6714) of 80% or more and particularly 85% or more, a hase value (JIS K7105) of 3.0 or less, preferably 1.0 or less and more preferably 0.5 or less, and a refractive index of 1.40–1.80 are suitably used in the present invention. As specific examples of the substrate, it is possible to suitably use synthetic resin films of polyethylene terephthalate, polyethylene naphthalate, triacetyl cellulose, polyarylate, polyimide, polyether, polycarbonate, polysulfone, polyether sulfone, cellophane, polyamide, polyethylene, polypropylene, polyvinyl alcohol, etc.

As the substrate which is not restricted to the above mentioned films, various sheet members such as plates made of the above mentioned resins, glass materials such as quartz glass, soda glass, etc. can be used in the present invention. When the substrate is the releasing paper or releasing film which is removed upon using, transparency is not required for the substrate. The thickness of the substrate 6 is suitable in a range of 0.5 μm–1 mm in view of productivity, though the thickness as thin as possible is desirable in view of lightening.

Next, the process for production of the optical film according to the present invention will be illustrated in reference with the optical sheet 10 shown in FIG. 2.

First, a coating solution prepared by dissolving a resin for forming the transparent resin layer 3 in a suitable solvent is applied to one side of the substrate 6 and is dried to form a laminated transparent resin layer 3. As the method of application, there are coating methods such as air-doctor coating, bar coating, blade coating, knife coating, reverse coating, transfer roll coating, gravure roll coating, kiss coating, cast coating, spray coating, slot orifice coating, calendar coating, electorodeposition coating, dip coating, die coating, etc. and printing methods, such as relief printing such as flexography, intaglio printing such as direct gravure printing and offset gravure printing, lithographic printing such as offset printing, and stencil printing such as screen printing.

The transparent fine particles 4 are then attached to the surface of the transparent resin layer 3. At this time, the transparent resin layer must have stickiness. When the pressure sensitive adhesive is used as the transparent resin, it is possible to allow to directly adhere the transparent fine particles 4. However, when the transparent resin other than the pressure sensitive adhesive is used, it is required that stickiness should be given to the surface of the transparent resin layer by heating, solvent application, etc. just before adhesion of the transparent fine particles. As the method of adhering the transparent fine particles 4, there are a method comprising directly sprinkling the transparent fine particles 4 on the transparent resin layer 3, a method comprising spraying the fine particles to the transparent resin layer by air-sprayer, a method comprising transferring from a brush or roll, etc. to which the transparent fine particles are attached, and a method comprising applying a dispersion of the transparent fine particles in a solvent. Fluidization dip coating using a fluidized bed is particularly preferred because the transparent fine particles are uniformly attached. In this stage, the transparent fine particles 4 may be simply attached to the surface of the transparent resin layer 3 by the tack strength of the transparent resin.

Then, the attached transparent fine particles 4 are pressed to be embedded in the transparent resin layer 3. As a means for pressing, is adopted impact blow by a press roller made of rubber or pressing medium. The pressing must be evenly conducted to the transparent fine particles 4 attached to the transparent resin layer 3. Therefore, it is preferable to use spherical particles as the pressing medium and impact the transparent fine particles by vibration. The size of the pressing medium is suitably selected according to the particle diameter and material of the transparent fine particles 4 to be embedded. However, it is generally preferable to use glass beads and ceramic beads having a size of about 0.3–2.0 mm.

Excessive transparent fine particles 4 as attached to the transparent resin layer 3 without being embedded in the transparent resin layer are then washed out by running water or the like to form the fine particle layer 5 which covers the surface of the transparent resin layer 3 as a monoparticle layer consisting of the transparent fine particles 4.

Finally, a coating solution or ink prepared by dissolving the resin for forming the transparent resin layer 2 in a proper solvent is applied by the coating method or printing method to the fine particle layer 5 which is fixed as a monoparticle layer, followed by hardening by heating or UV irragiation, as needed, to produce the optical sheet 10.

The resin of the transparent resin layer 2 and that of the transparent resin layer 3 may be the same or different each other. In the other process for production, the optical sheet 11 can also be produced by laminating the transparent resin layer 2 previously applied to another substrate 6 on the fine particle layer 5, instead of applying the resin for forming the transparent resin layer 2 to the fine particle layer 5.

In the optical sheet of the present invention, although the fine transparent particles 4 are arranged as a monoparticle layer, it is necessary to prevent involvement of the air to the crevice and to fill up the crevice with the transparent resin of the both sides, since the crevice exists between transparent fine particles. Therefore, in the step of embedding the transparent fine particles 4 in the transparent resin layer 3, the transparent fine particles 4 are embedded such a manner that ½ or more of the volume thereof are buried in the transparent resin layer 3, or the coating solution or ink, the viscosity of which is adjusted to low so that the crevice between particles could fully be permeated, is used for applying on the fine particle layer 5.

The optical sheet having no substrate can be produced by the method which comprises laminating the transparent resin layer 3, the fine particle layer 5 and the transparent resin layer 2 on the temporary substrate such as releasing film by the above-mentioned method, and removing then the temporary substrate.

Next, an example of using the optical sheet of this invention is illustrated.

Figure 4:
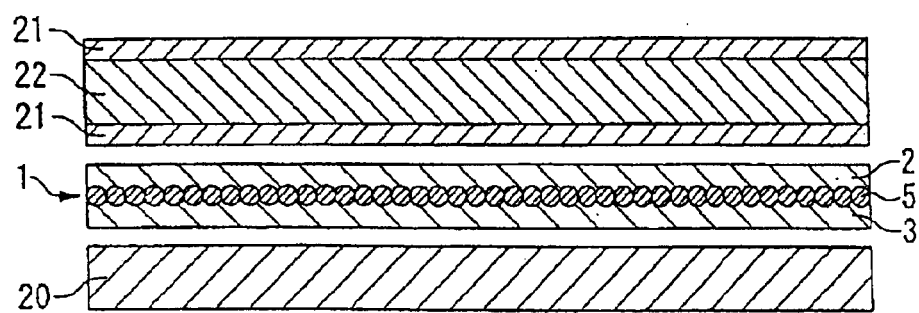
FIG. 4 is a cross sectional view typically illustrating an example of the transmission type liquid crystal display using the optical sheet according to the present invention.

FIG. 4 is a schematic sectional view showing an example of the transmission type liquid crystal display using the optical sheet according to the present invention. This transmission type liquid crystal display has the structure that the optical sheet 1 is inserted between the back light unit 20 and the liquid crystal cell 22 which is sandwiched by the polarizing plates 21, 21.

In such a transmission type liquid crystal display, the optical sheet 1 efficiently diffuses the light from the backlight unit 20 while the light efficiently passes through the optical sheet. As a result, it is possible to prevent deterioration of the visibility caused by the printing pattern of the acrylic light conductive plate and the pattern of the prism sheet which constitute the back light unit, while maintaining high light transparency.

EXAMPLES

The present invention will hereafter be described by specific examples.

Example 1

A coating solution was prepared by diluting UV curable resin (trade name: Aronix UV-3300, manufactured by Toa Gosei Chemical Industry Co., Ltd; refractive index after hardened: 1.51) with MIBK (methylisobutylketone).

As the substrate 6, was used a triacetyl cellulose film (trade name: Fujitack UVD80, refractive index: 1.49, total light transmittance: 92.4%, haze: 0.15, product of Fuji Photo Film Co., Ltd.) having a thickness of 80 µm. The above mentioned coating solution was applied on to one side of this substrate 6 by a reverse coater so as to give a dry film thickness of 11 µm and then dried at 100° C. for 2 minutes to form a transparent resin layer 3, the refractive index after hardening of which was 1.51.

Next, the transparent resin layer 3 was covered with transparent fine particles 4. As the transparent fine particles 4, were used methylsilicone fine particles having an average particle diameter of 4.5 µm and a refractive index of 1.42 (trade name: Tospearl 145, product of GE Toshiba Silicone Co., Ltd.). The substrate 6, on which the transparent resin layer 3 had been formed, was passed through a fluidized bed in which the above mentioned fine particles 4 had been contained, thereby attaching the transparent fine particles 4 to the surface of the transparent resin layer 3. Further, truly spherical zirconia spheres having a particle diameter of 0.5 mm were placed as a pressing medium in a container, and the substrate, to which the transparent fine particles 4 had been attached, was immersed by passsing through the container while vibrating the container, thereby embedding the transparent fine particles 4 in the transparent resin layer 3. After washing is conducted to remove excessive transparent fine particles 4, the transparent resin layer 3 was hardened by ultraviolet irradiation to form a fine particle layer 5 on the surface of the transparent resin layer 3, wherein it was covered with the transparent fine particles 4.

Furthermore, the above mentioned coating was applied onto the fine particle layer 5 by a blade coater so as to give a dry film thickness of 11 µm and then dried at 100° C. for 2 minutes, followed by hardening by ultraviolet irradiation to form the transparent resin layer 2. Thus, an optical sheet of Example 1 as shown FIG. 2 was obtained.

Example 2

To 100 parts by weight of buthyl acrylate pressure sensitive adhesive having a refractive index of 1.47 (trade name: H-6F, product of Soken Chemical & Engineering Co., Ltd.) were added 0.3 parts by weight of trifunctional isocyanate (trade name: D-90, product of Soken Chemical & Engineering Co., Ltd.) and diluted the resultant mixture with MIBK to prepare a coating solution.

As the substrate 6, was used a triacetyl cellulose film (trade name: Fujitack UVD80, refractive index: 1.49, total light transmittance: 92.4%, haze: 0.15, product of Fuji Photo Film Co., Ltd.) having a thickness of 80 82 m. The above mentioned coating solution was applied to one side of this substrate 6 by a reverse coater so as to give a dry film thickness of 11 µm and then dried at 100° C. for 2 minutes. Thereafter, aging was conducted at 60° C. for a day to form a transparent resin layer 2 (or 3). Two of the same sheets were produced.

Next, the treatment of covering the surface of the transparent resin layer 3 with the transparent fine particles 4 was carried out by the same manner as in Example 1 to form a fine particle layer 5.

Finally the substrate 6, on which the transparent resin layer 2 was formed, was laminated on the fine particle layer 5 such a manner that the transparent resin layer 2 was brought in contact with the fine particle layer 5, thereby forming an optical sheet of Example 2 as shown FIG. 3.

Example 3

An optical sheet of Example 3 was obtained by the same manner as in Example 2, except that polystyrene fine particles having an average particle diameter of 5.0 µm and a refractive index of 1.59 (trade name: TS-50, product of Soken Chemical & Engineering Co., Ltd.) were used instead of the methylsilicone fine particles.

Example 4

To 100 parts by weight of buthyl acrylate pressure-sensitive adhesive having a refractive index of 1.47 (trade name: H-6F, product of Soken Chemical & Engineering Co., Ltd.), were added 0.3 parts by weight of trifunctional isocyanate (trade name: D-90, product of Soken Chemical & Engineering Co., Ltd.) and diluted the resultant mixture with MIBK to prepare a coating solution.

As the substrate 6, was used a triacetyl cellulose film (trade name: Fujitack UVD80, refractive index: 1.49, total light transmittance: 92.4%, haze: 0.15, product of Fuji Photo Film Co., Ltd.) having a thickness of 80 µm. The above mentioned coating solution was applied to one side of this substrate 6 by a reverse coater so as to give a dry film thickness of 11 µm and then dried at 100° C. for 2 minutes. Aging was then conducted at 60° C. for a day to form a transparent resin layer 3.

Thereafter, the treatment of covering the surface of the transparent resin layer 3 with the transparent fine particles 4 was carried out by the same manner as in Example 1 to form a fine particle layer 5.

A coating was prepared by diluting UV curable resin (trade name: Aronix UV-3300, manufactured by Toa Gosei Chemical Industry Co., Ltd; refractive index after hardened: 1.51) with MIBK.

Then, the above mentioned coating solution was applied to the fine particle layer 5 by a blade coater so as to give a dry film thickness of 11 µm and then dried at 100° C. for 2 minutes, followed by hardening by ultraviolet irradiation to form a transparent resin layer 2, thereby obtaining an optical sheet of Example 4 as shown in FIG. 2.

Comparative Example 1

To 100 parts by weight of UV curable resin (trade name: Aronix UV-3300, manufactured by Toa Gosei Chemical Industry Co., Ltd; refractive index after hardened: 1.51) were added 12.5 parts by weight of methylsilicone fine particles having an average particle diameter of 4.5 µm and a refractive index of 1.42 (trade name: Tospearl 145, product of GE Toshiba Silicone Co., Ltd.) as the transparent fine particles 4 and diluted the resultant mixture with MIBK to prepare a coating solution.

Figure 5:
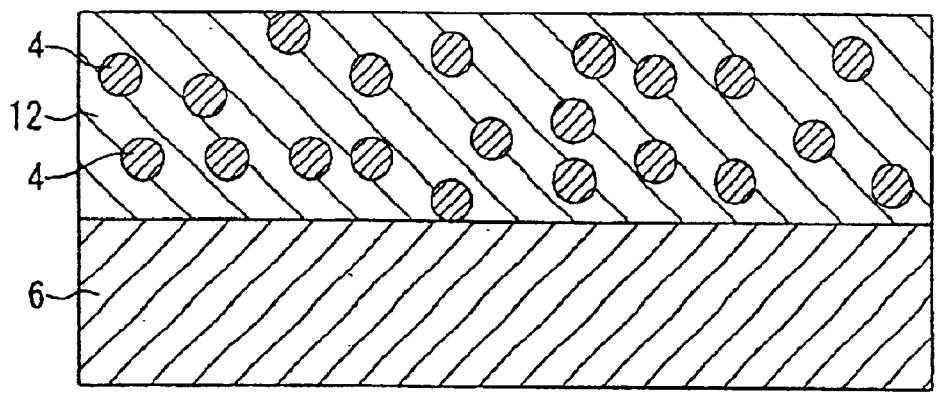
FIG. 5 is a cross sectional view typically illustrating the optical sheet of Comparative Example 1.

The above mentioned coating solution was applied to one side of a triacetyl cellulose film (trade name: Fujitack UVD80, refractive index: 1.49, total light transmittance: 92.4%, haze: 0.15, product of Fuji Photo Film Co., Ltd.) having a thickness of 80 µm by a reverse coater so as to give a dry film thickness of 25 µm and then dried at 100° C. for 2 minutes, followed by hardening by ultraviolet irradiation to obtain an optical sheet of Comparative Example 1 which contained the transparent fine particles in the same amount per unit volume of the transparent resin layer as that of the optical sheet in Example 1. In the resultant optical sheet, the transparent fine particles 4 were randomly dispersed in the transparent resin layer 12 as shown in FIG. 5.

Comparative Example 2

To 100 parts by weight of buthyl acrylate pressure sensitive adhesive having a refractive index of 1.47 (trade name: H-6F, product of Soken Chemical & Engineering Co., Ltd.) were added 4.5 parts by weight the methyl silicone fine particles described in Comparative Example 1 as the transparent fine particles 4 and 0.3 parts by weight of trifunctional isocyanate (trade name: D-90, product of Soken Chemical & Engineering Co., Ltd.) and diluted the resultant mixture with MIBK to prepare a coating solution.

Figure 6:
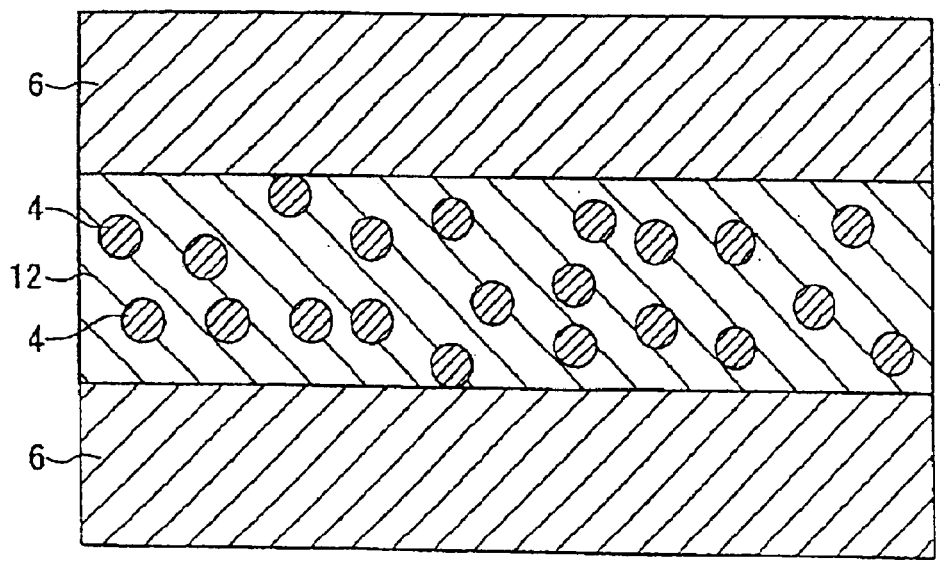
FIG. 6 is a cross sectional view typically illustrating the optical sheets Comparative Examples 2 and 3.

The above mentioned coating solution was applied to one side of a triacetyl cellulose film (trade name: Fujitack UVD80, refractive index: 1.49, total light transmittance: 92.4%, haze: 0.15, product of Fuji Photo Film Co., Ltd.) having a thickness of 80 μm by a reverse coater so as to give a dry film thickness of 25 μm and then dried at 100° C. for 2 minutes to form a transparent resin layer 12. The same triacetyl cellulose film (trade name: Fujitack UVD80, product of Fuji Photo Film Co., Ltd.) having a thickness of 80 μm was then laminated on the formed transparent resin layer 12, followed by ageing at 60° C. for a day to produce an optical sheet of Comparative Example 2 which contained the transparent fine particles in the same amount per unit volume of the transparent resin layer as that of the optical sheet in Example 2. In the resultant optical sheet, the transparent fine particles 4 were dispersed at random in the transparent resin layer 12 as shown in FIG. 6.

Comparative Example 3

An optical sheet of Comparative Example 3 which contained the transparent fine particles in the same amount per unit volume of the transparent resin layer as that of the optical sheet in Example 3 was obtained by the same manner as in Comparative Example 2, except that 3.7 parts by weight polystyrene fine particles having an average particle diameter of 5.0 μm and a refractive index of 1.59 (trade name: TS-50, product of Soken Chemical & Engineering Co., Ltd.) were used instead of the methylsilicone fine particles.

Comparative Example 4

To 100 parts by weight of buthyl acrylate pressure-sensitive adhesive having a refractive index of 1.47 (trade name: H-6F, product of Soken Chemical & Engineering Co., Ltd.), were added 0.3 parts by weight of trifunctional isocyanate (trade name: D-90, product of Soken Chemical & Engineering Co., Ltd.) and diluted the resultant mixture with MIBK to prepare a coating solution.

As the substrate 6, was used a triacetyl cellulose film (trade name: Fujitack UVD80, refractive index: 1.49, total light transmittance: 92.4%, haze: 0.15, product of Fuji Photo Film Co., Ltd.) having a thickness of 80 μm. The above mentioned coating solution was applied to one side of this substrate 6 by a reverse coater so as to give a dry film thickness of 11 μm and then dried at 100° C. for 2 minutes, followed by ageing at 60° C. for a day to form a transparent resin layer 3.

Figure 7:
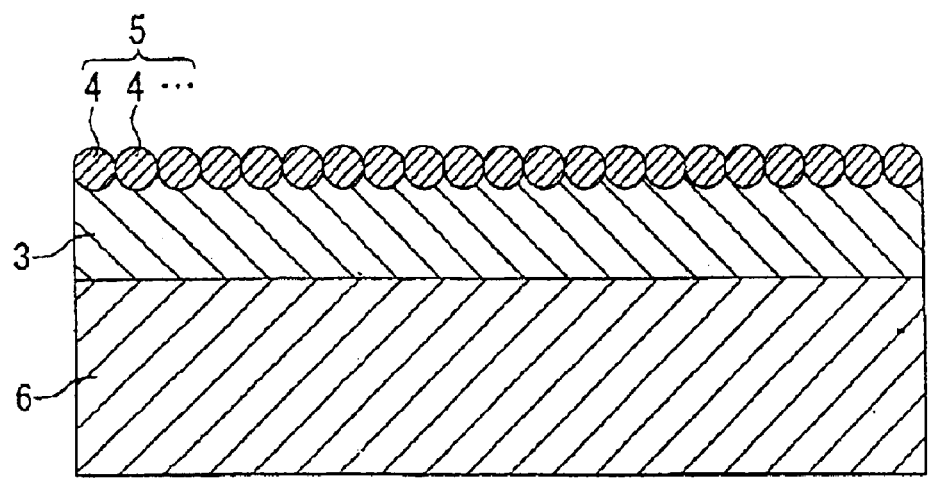
FIG. 7 is a cross sectional view typically illustrating the optical sheet of Comparative Example 4.

Thereafter, the treatment of covering with the transparent fine particles 4 was carried out by the same manner as in Example 1 to obtain an optical sheet of Comparative Example 4 as shown in FIG. 7, which did not have the transparent resin layer on the surface of the fine particle layer.

Figure 8:
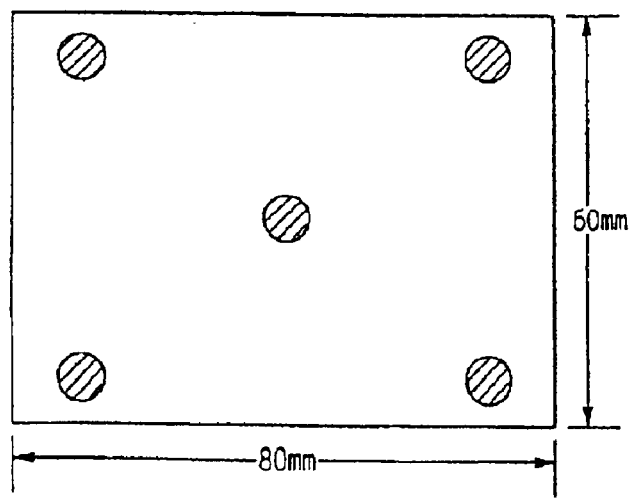
FIG. 8 is a schematic view of showing measurement point for testing optical properties of the optical sheet.

[Evaluation]
(Test of Optical Properties)
With respect to the optical sheets according to Examples 1 to 4 and Comparative Examples 1 to 4, incident light was applied to one side of the optical sheet having the size of 60 mm×80 mm so as to be irradiated 5 points of the four coners and the center as shown in FIG. 8. Total light ray transmittance: Tt (%), average value of haze: Hz (%), and difference between the maximum haze and the minimum haze of 5 points: ΔHz (%) were measured by means of an NDH2000 manufacture by Nippon Denshoku Kogyo K.K.

TABLE 1

|  | Tt (%) | Hz (%) | ΔHz (%) |
| --- | --- | --- | --- |
| Example 1 | 95.6 | 80.6 | 0.2 |
| Example 2 | 94.7 | 67.7 | 0.3 |
| Example 3 | 94.4 | 81.7 | 0.2 |
| Example 4 | 95.8 | 83.9 | 0.1 |
| Comparative Example 1 | 92.3 | 71.0 | 1.1 |
| Comparative Example 2 | 92.1 | 61.9 | 1.3 |
| Comparative Example 3 | 92.9 | 70.3 | 1.0 |
| Comparative Example 4 | 95.3 | 68.5 | 3.5 |

As apparent from Table 1, the optical sheets of Examples 1–3 show high values in total light ray transmittance and haze and have each a small difference in haze values as compared with the optical sheets of Comparative Examples 1–3 which are the interior light diffusers. The optical sheet of Examples 4 shows high total light ray transmittance. It has also a very small difference in haze values as compared with the optical sheet of Comparative Example 4 which is the exterior light diffuser. The optical sheets according to the present invention which have a monoparticle layer consisting of transparent fine particles can effectively transmit and diffuse the light as compared with the prior interior light diffusers which contain fine particles dispersed at random, and can diffuse the light in more uniform than the exterior light diffusers.

As illustrated above, in the optical sheet according to the present invention, the number of times to which incident light passes through the inside of a transparent particle can be limited to once, because it comprises a transparent resin layer and a fine particle layer consisting of transparent fine particles which are arranged as a monoparticle layer in said transparent resin layer, wherein the refractive index of the transparent resin layer and that of the transparent fine particles are different each other. Therefore, excessive light scattering as in the prior interior light diffuser is not caused, and irregularity of the surface as in the exterior light diffuser is not required. Consequently, according to the present invention, high light transparency and uniform light diffusivity can be sufficiently exhibited.

Such an optical sheet demonstrates excellent effects such as prevention of luminance irregularity, improvement of contrast, widening the visual field angle, etc. in various displays such as LCD, EL, FED, etc. In addition, when the releasing paper or releasing film is used as the substrate and the transparent resin layer is composed of a pressure sensitive adhesive, the optical sheet itself can be used as the adhesive member.

Moreover, according to the process for production of the optical sheet of the present invention, the optical sheet having and exhibiting the high light transparency and the uniform light diffusivity, which has the fine particle layer consisting of transparent fine particles arranged as a monoparticle layer between two transparent resin layer, can be easily produced by carrying out at least a step of forming a transparent resin layer having at least temporary stickiness on a substrate, a step of forming a fine particle layer by covering said transparent resin layer with transparent fine particles so as to form a monoparticle layer and fixing them, and a step of laminating a transparent resin layer on said fine particle layer.

What is claimed is:

1. An optical sheet which comprises a light transmissive resin layer and a fine particle layer consisting of transparent fine particles which are entirely embedded in said light transmissive resin layer as a monoparticle layer, wherein said transparent fine particles have a particle diameter of 1–10 μm and the refractive index of said light transmissive resin layer is different from that of said transparent fine particles, and is in a range of 1.4–1.7, and wherein said transparent fine particles are light diffusing media.

2. An optical sheet according to claim 1, wherein substrate is laminated on a side or both sides of said light transmissive resin layer.

3. An optical sheet according to claim 2, wherein said substrate is a transparent substrate.

4. An optical sheet according to claim 2, wherein said substrate is releasing paper or releasing film.

5. An optical sheet according to claim 1, wherein said light transmissive resin layer consists of two transparent resin layers and said fine particle layer is formed on the boundary plane of said two transparent resin layers.

6. An optical sheet according to claim 5, wherein substrate is laminated on the surface of at least one of said transparent resin layers.

7. An optical sheet according to claim 6, wherein said substrate is a transparent substrate.

8. An optical sheet according to claim 6, wherein s substrate is releasing paper or releasing film.

9. An optical sheet according to claim 5, wherein least one of two transparent layers is composed of a pressure-sensitive adhesive.

10. A process for production of an optical sheet according to claim 1 which comprises at least a step of forming a transparent resin layer having at least temporary stickiness on a substrate, a step of forming a fine particle layer by covering said transparent resin layer with transparent fine particles having a particle size of 1–10 μm so as to form a monoparticle layer and fixing them, and a step of laminating a transparent resin layer on said fine particle layer.

* * * * *